United States Patent [19]
Baumert et al.

[11] Patent Number: 5,448,193
[45] Date of Patent: Sep. 5, 1995

[54] NORMALIZATION OF APPARENT PROPAGATION DELAY

[75] Inventors: Robert J. Baumert, Allentown; Richard Muscavage, Gilbertsville; Robert L. Pritchett, East Allen Township, all of Pa.

[73] Assignee: AT&T Corp., Murray Hill, N.J.

[21] Appl. No.: 290,170

[22] Filed: Aug. 15, 1994

Related U.S. Application Data

[63] Continuation of Ser. No. 972,187, Nov. 5, 1992.

[51] Int. Cl.[6] .............................. H03K 5/13
[52] U.S. Cl. .................... 327/156; 327/155; 327/236; 327/244
[58] Field of Search ............. 307/269, 270, 511, 529; 328/155, 63, 55; 377/78, ; 327/141, 144, 145, 146, 147, 149, 150, 153, 155, 156, 158, 159, 231, 243, 244, 250, 251, 233, 236

[56] References Cited

U.S. PATENT DOCUMENTS 5,268,656 12/1993 Muscavage .................... 331/45

OTHER PUBLICATIONS

TQS Computing and Networking Semiconductor, Inc., 2300 Owen St., Santa Clara, CA 95054-6 pages "Multi-Phase Clock Generato/LowSkew TTL Clock Buffer

*Primary Examiner*—Timothy P. Callahan
*Assistant Examiner*—T. Lam
*Attorney, Agent, or Firm*—David L. Smith

[57] ABSTRACT

An integrated circuit includes a clock alignment circuit having a frequency synthesizer for receiving a reference clock signal at a lower frequency and for generating phases of an oscillator clock signal at a higher frequency. The oscillator clock signal phases drive a desired clock signal generating circuit that generates various phases of the desired clock signal. The desired clock signal phases are systematically compared to the reference clock signal. The phase of the desired clock signal that is determined to align with the reference clock signal is provided as the desired clock signal output from the integrated circuit such that there is no apparent time delay through the integrated circuit. In an alternate embodiment, a single phase of the desired clock signal is selected and a phase locked loop adjusts the oscillator in the frequency synthesizer to align the selected phase of the desired clock signal with the reference clock signal.

20 Claims, 7 Drawing Sheets

NORMALIZATION OF APPARENT PROPAGATION DELAY

This application is a Rule 1.53 continuation of our application Ser. No. 07/972187 filed on Nov. 5, 1992.

TECHNICAL FIELD

This invention relates generally to integrated circuits and particularly to integrated circuits with a clock alignment circuit for aligning two clock signals.

BACKGROUND OF THE INVENTION

In microprocessor-based systems, it is often desirable to expand or fan-out the clock signal beyond the number of outputs available from the integrated circuit that produces the clock signal. Two solutions are commonly used to achieve the clock signal expansion. In the first solution, a master oscillator is used to drive one or more slave oscillators. This solution suffers from process variations during manufacture of various slave oscillators that cause the delay through one oscillator to differ slightly from the delay through another oscillator. In the second solution, a phase-locked-loop is used to synchronize the phase from two clocks, on one circuit board, that are of the same frequency. Such a solution is disclosed in U.S. Pat. No. 5,101,117 in which a common clock signal is provided to first and second voltage controlled delay lines. The first delay line delays the clock signal a fixed interval before supplying it to a first device. The second delay line receives the clock signal and delays it an adjustable time interval before supplying the delayed signal to a second device. The duration of the adjustable time delay is controlled by a voltage control signal that is generated by a phase-locked-loop circuit comparing the phase of the outputs on the two devices. A disadvantage of this solution is that it is only applicable to synchronizing two clock signals of the same frequency.

An improved alignment method is desired that overcomes the variation in delay through clock generating circuits due to process variations and, in addition, is capable of aligning clock signals of differing frequencies.

SUMMARY OF THE INVENTION

In accordance with an embodiment of the present invention, an integrated circuit has a frequency synthesizer for receiving a reference clock signal at a lower frequency and for generating various phases of an oscillator clock signal at a higher frequency. The oscillator clock signal phases drive a desired clock signal phase generation circuit. A clock phase selection circuit systematically selects one of the desired clock signal phases for comparison to the reference clock signal. In another embodiment of the invention, a window of time during which the desired clock signal should align with the reference clock signal is defined by a masking circuit. The selected desired clock signal phase is compared to the reference clock signal during the time window by a phase detector to determine if the selected desired clock signal phase is aligned with the reference clock signal. The desired clock signal phase that is determined to align with the reference clock signal is provided as the clock output signal from the integrated circuit with the result that there is no apparent delay through the integrated circuit. In an alternate embodiment, one of the desired clock signal phases is selected and, through operation of a phase locked loop, is adjusted to align with the reference clock signal.

DETAILED DESCRIPTION

Figure 1:
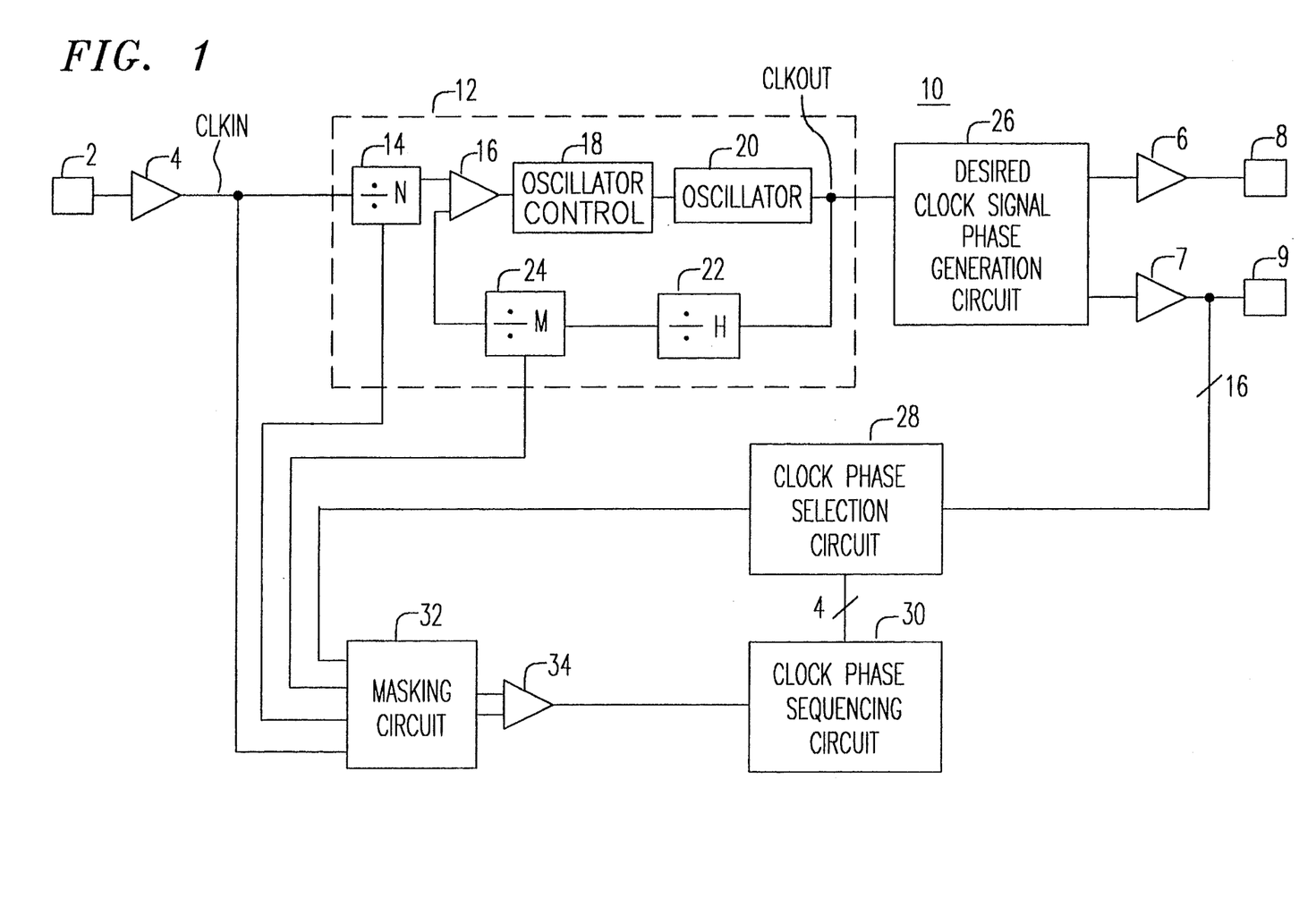
FIG. 1 is a schematic diagram illustrating a clock alignment circuit.

Referring to FIG. 1, a schematic diagram illustrating an integrated circuit employing a clock alignment circuit 10 is shown. Frequency synthesizer phase-locked-loop clock generating circuit 12 receives a reference clock signal CLKIN of frequency FIN as an input and generates an oscillator clock signal CLKOUT at a frequency FOUT as an output. The frequency of oscillator clock signal CLKOUT is higher than the frequency of reference clock signal CLKIN and is programmable by setting parameters M and N. The reference clock signal CLKIN is received by the integrated circuit at pad 2 and is coupled as the input to input driver 4. The output of input driver 4 is coupled to the input of divide by N counter 14. The output of divide by N counter 14 is coupled to phase detector 16 as a first input. The output of phase detector 16 is coupled to the input of oscillator control 18. The output of oscillator control 18 is coupled to the input of oscillator 20. The output of oscillator 20 is the oscillator clock signal. The frequency of the oscillator clock signal, CLKOUT, is $(H \times M)/N$ multiplied times the frequency of CLKIN, where M and N are user defined variables and H is the multiple of the oscillator clock signal frequency to the frequency of a desired or programmed clock signal, DCF, selected by the user. DCF is generated to clock devices on a circuit board on which the integrated circuit containing the clock alignment circuit is mounted. The oscillator output is coupled to the clock input of divide by H counter 22. The output of divide by H counter 22 provides an output at the same frequency as the desired or programmed clock signal. The output of the divide by H counter is coupled to the clock input of divide by M counter 24. The output of divide by M counter 24 is coupled as the second input to phase detector 16.

The oscillator clock signal output from frequency synthesizer phase-locked-loop clock generating circuit 12 is provided to a desired clock signal phase generation circuit 26. Circuit 26 generates one or more phases of the desired clock signal. An illustrative desired clock signal phase generating circuit will be described below in more detail. The various desired clock signal phases are coupled as inputs to output drivers 6 and 7 which are coupled respectively to pads 8 and 9. Pad 8 is used to conduct the desired clock signal off chip. Pad 9 is a dummy pad that is not coupled to a pin. Pad 9 is coupled as the first input to clock phase selection circuit 28 wherein a particular one of the desired clock signal phases is selected based on a control signal, coupled as a second input to clock phase selection circuit 28. The second input is received from clock phase sequencing circuit 30. The selected desired clock signal phase is the output of circuit 28 and is coupled as one of the inputs to masking circuit 32. The other signals coupled as inputs to masking circuit 32 include the output of divide by M counter 24, the output of divide by N counter 14, and the output of input driver 4 which is the reference clock signal CLKIN.

Masking circuit 32 provides two outputs coupled as inputs to phase detector 34. The output of phase detector 34 is coupled as an input to clock phase sequencing circuit 30.

Figure 2:
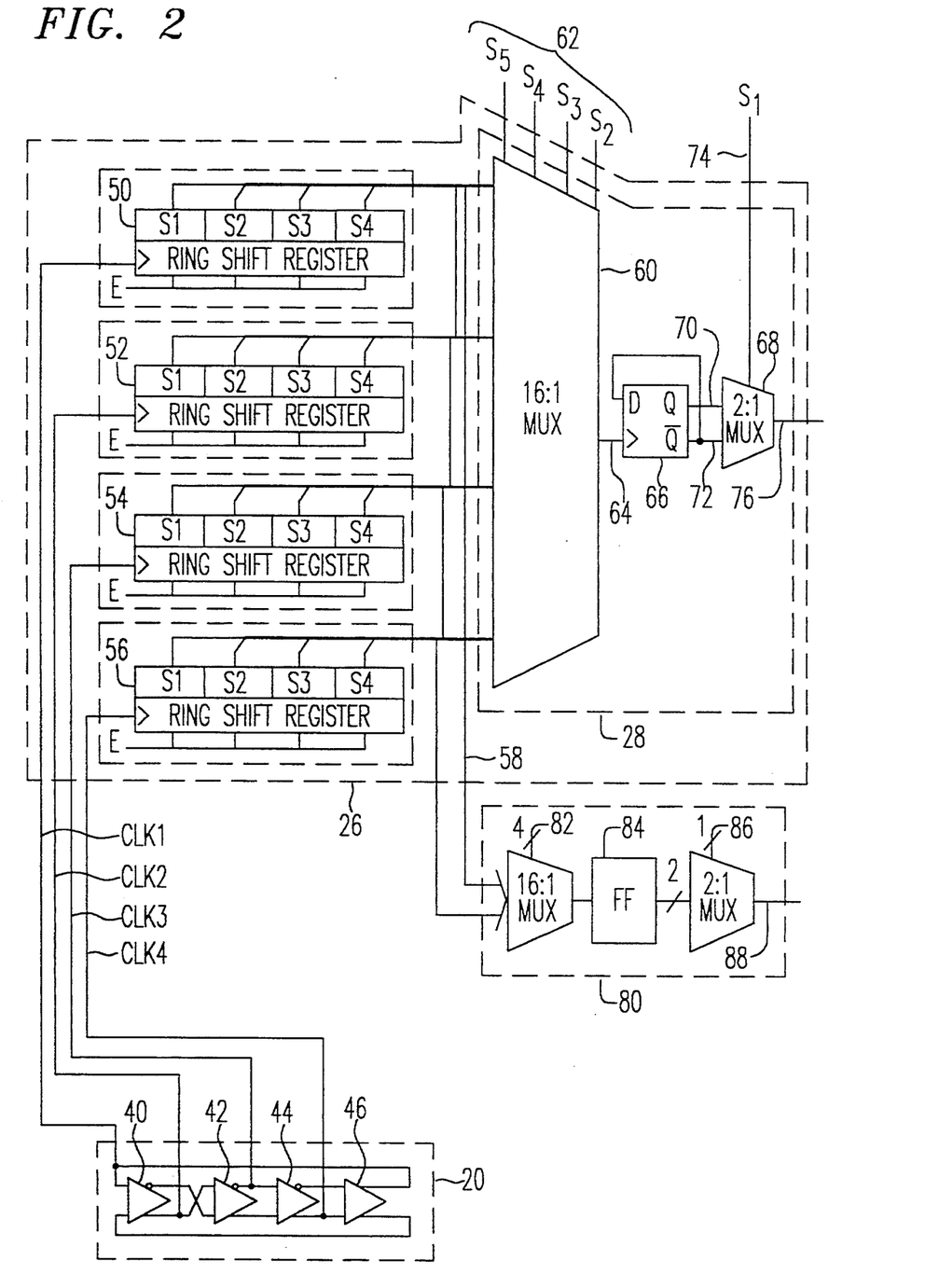
FIG. 2 is a schematic diagram illustrating a programmable desired clock signal phase generation circuit.
Figure 3:
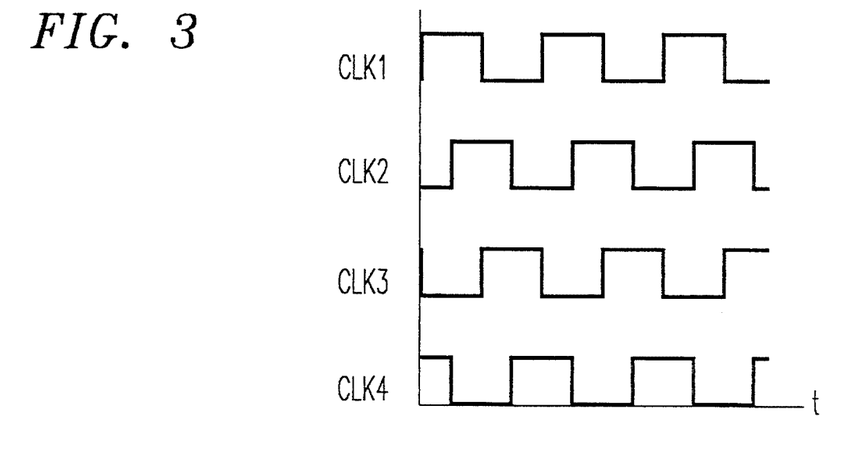
FIG. 3 is a graphical diagram illustrating phases of an oscillator clock signal equally spaced over the oscillator clock period.

FIG. 2 is a schematic diagram that illustrates a desired clock signal phase generating circuit 26 driven by oscillator 20. Circuit 26 generates the desired clock signal phases which are coupled as inputs to clock phase selection circuit 28. Oscillator 20 is illustrated in greater detail as a multiple stage oscillator in which the stages 40, 42, 44 and 46 are substantially identical. The oscillator may be voltage or current controlled as is known in the art. Outputs are tapped off of selected ones of the stages to provide a plurality of phases of the oscillator clock signal. The number of oscillator clock phases generated is dependent on the configuration of the oscillator and the number and increment of desired or programmed clock signal phases to be generated. A four-stage oscillator is illustrated in which each stage is tapped to provide quadrature oscillator clock phases CLK1, CLK2, CLK3 and CLK4. The oscillator clock phases are illustrated in FIG. 3.

Each oscillator stage 40, 42, 44 and 46 provides a quadrature oscillator clock phase as a clock signal to a respective one of a plurality of ring counters or ring shift registers 50, 52, 54 and 56. The output of stage 46, CLK1, is the clock signal for multiple stage ring shift register 50. The output of stage 40, CLK2, is the clock signal for multiple stage ring shift register 52. Similarly, the output of stages 42 and 44, respectively CLK3 and CLK4, are the clock signals for multiple stage ring shift registers 54 and 56, respectively.

Ring shift registers 50, 52, 54 and 56 are illustrated as having four stages designated S1 through S4. Each stage of each of the multiple stage ring shift registers 50, 52, 54 and 56 can be enabled and is preset upon powering up. Each stage provides an output coupled to the input of multiplexer 60. Each stage of the ring shift registers may be substantially identical. Many types of devices can provide the desired function of each stage of the ring shift registers. In a preferred embodiment, differential flip flops are used.

Ring shift register 52 is identical to ring shift register 50 with each stage clocked by oscillator clock phase CLK2. Ring shift registers 54 and 56 are also identical to ring shift register 50 are and clocked respectively by oscillator clock phases CLK3 and CLK4. The output of each stage of ring shift registers 50, 52, 54 and 56 collectively form bus 58. In the illustrative embodiment there are sixteen outputs forming bus 58. Concomitantly, multiplexer 60 is a 16:1 multiplexer with four select bits of control 62 to select one of the inputs as the output 64.

Multiplexer 60, flip flop 66, and multiplexer 68 comprise a clock phase selection circuit 28 that may be used with the above-described clock phase generation circuit. Output 64 provides the clock input to a divide by two counter such as flip flop 66. The output 70 of flip flop 66, and its inverse 72, are coupled as inputs to multiplexer 68. Multiplexer 68 is a 2:1 multiplexer controlled by select bit 74 to select one of the inputs 70 or 72 as output 76. The outputs from the stages of shift registers 50, 52, 54, and 56 are the first sixteen phases of the desired clock signal. The next sixteen phases are generated by flip flop 66 as the inverse output.

Clock phase sequencing circuit 30 controls setting select inputs 62 and 74. Clock phase sequencing circuit 30 sets select inputs 62 and 74 to sequence through the desired clock signal phases available on bus 58 and the inverse phases generated by flip flop 66.

The output of each stage of ring shift registers 50, 52, 54 and 56 is available on bus 58 and may be coupled as inputs to other multiplexers to provide any one or more of the desired clock signal phases as outputs to clock devices on the circuit board on which the integrated circuit is mounted. An output circuit 80 is illustrated in FIG. 2 that functions in a manner similar to clock phase selection circuit 28. Output circuit 80 includes 16:1 multiplexer 82 with inputs coupled to bus 58. The output of multiplexer 82 is coupled to the clock input to flip flop 84. The output signal from flip flop 84 and the inverse are coupled as the inputs to 2:1 multiplexer 86. By setting the select inputs on multiplexers 82 and 86, any of the outputs of the stages of ring shift registers 50, 52, 54 and 56, or the inverse, are available as an output 88.

The clock alignment circuit shown in FIG. 1 comprises two phase locked loops. A first phase locked loop is within clock generating circuit 12 and an external second phase locked loop extends from input pad 2, through input driver 4, to dummy pad 9 for aligning the desired clock signal with the reference clock signal.

Figure 7:
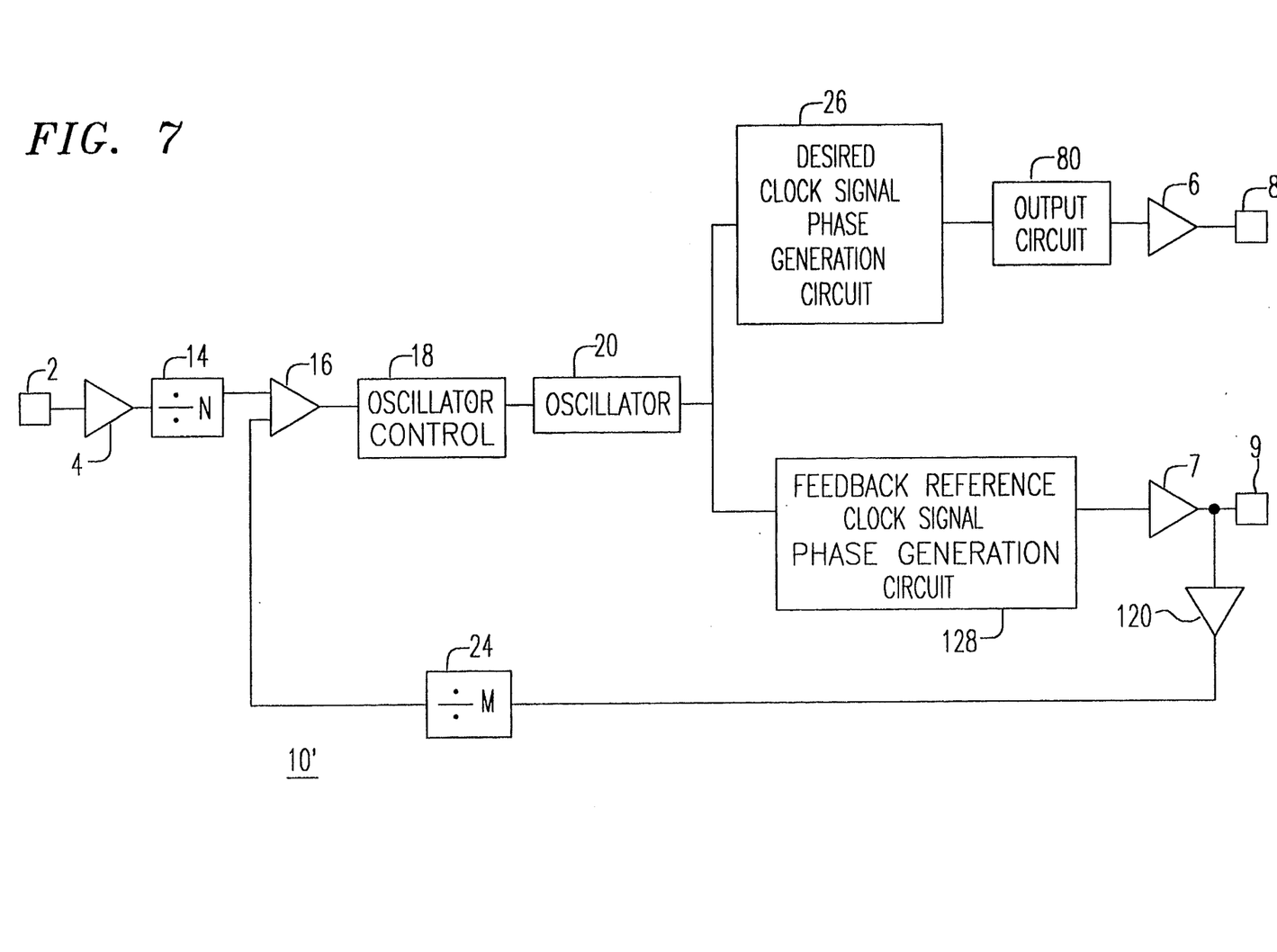
FIG. 7 is a schematic diagram illustrating an alternate embodiment clock alignment circuit.

An alternate embodiment clock alignment circuit 10' is shown in FIG. 7 comprising a single phase locked loop in which the phase locked loop extends from an input pad to an output pad. Clock alignment circuit 10' receives the reference clock signal at pad 2 which is coupled as the input to input driver 4. Input driver 4, divide by N counter 14, divide by M counter 24, phase detector 16, oscillator control 18, oscillator 20, circuit 26, output circuit 80, and output driver 6 are interconnected as described above.

Clock phase selection circuit 128 generates a portion of the desired clock signal phases and provides as an output one of the desired clock signal phases. The output of clock phase selection circuit 128 is coupled as the input to output driver 7. The output of output driver 7 is coupled to dummy pad 9 and is coupled as the input to input driver 120. The output of input driver 120 is coupled to the clock input of divide by M counter 24.

Figure 8:
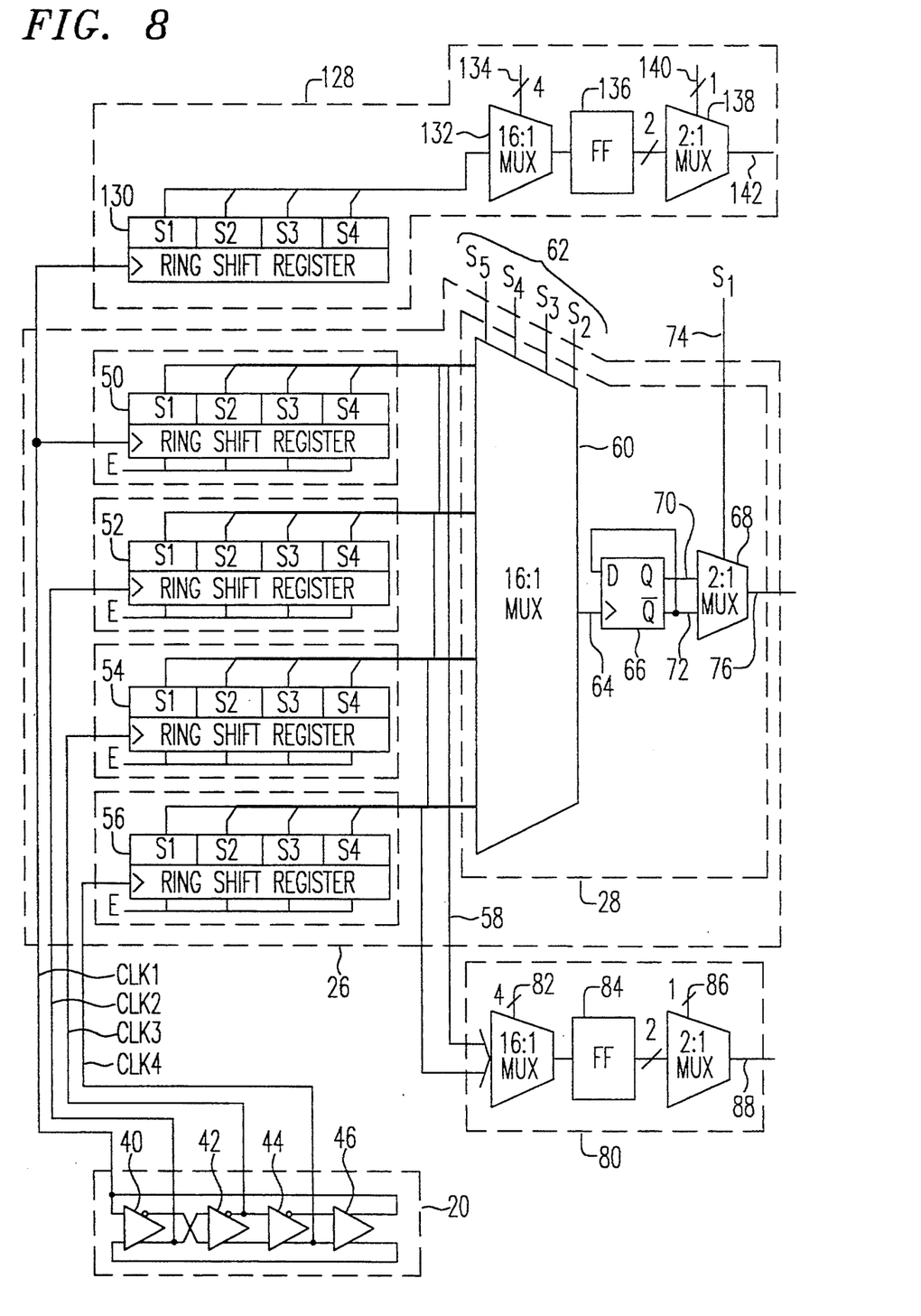
FIG. 8 is a schematic diagram, similar to FIG. 2, useful with the alternate embodiment of FIG. 7.

As shown in FIG. 8, clock phase selection circuit 128 in the illustrative embodiment comprises a ring shift register 130, with as many stages as ring shift register 50, clocked by an oscillator clock signal phase. The output of each stage of ring shift register 130 is coupled as an input to 16:1 multiplexer 132. Multiplexer 132 is controlled by input select bits 134 to select one of the inputs as an output. The output of multiplexer 132 is coupled as the input to a divide by two circuit, such as flip flop 136. The output and inverse from flip flop 136 are coupled as inputs to 2:1 multiplexer 138. Input select bit 140 determines which input to multiplexer 138 is provided as output 142.

In operation, parameters M and N are defined based on the frequency FIN and the desired or programmed clock signal frequency, as is known in the art. Frequency synthesizer phase-locked-loop clock generating circuit 12 generates an oscillator clock signal output CLKOUT at frequency FOUT that is a multiple, H, of the desired or programmed clock signal frequency. Divide by M counter 24 generates an output a signal, at the same frequency as the desired clock signal frequency, for use by clock generating circuit 12 by dividing down the oscillator clock signal frequency by M.

Oscillator 20 in the illustrative embodiment generates a plurality of timing signals that are various phases of the oscillator clock signal. Oscillator 20 generates the oscillator clock signal as a first quadrature oscillator clock phase CLK1; a 90° phase-shifted second quadrature oscillator clock phase CLK2; a 180° phase-shifted third quadrature oscillator clock phase CLK3; and a 270° phase-shifted fourth quadrature oscillator clock phase CLK4. These four oscillator clock phase signals have the same frequency as the oscillator clock signal but are phase shifted as can be seen in FIG. 3.

CLK1 provides the reference signal with the rising leading edge arbitrarily defined as the 0° phase shift. The rising leading edge of CLK2 is 90° delayed from CLK1. Similarly, the rising leading edge of CLK3 and CLK4 are respectively 180° and 270° delayed relative to CLK1. In this manner, four quadrature oscillator clock phase signals are generated. Oscillator 20 is shown as a differential, multiple stage oscillator in which each stage has two inputs and two outputs, a signal and its inverse. Using a differential stage oscillator has the advantage of better noise immunity. Since one of the signals is high and the other is low, they tend to drift uniformly with the power supply.

On power-up, each of the ring shift register stages is preset. Advantage is taken of prior knowledge of the desired clock signal being generated. In a preferred embodiment, the stages of each ring shift register are initialized to have one zero-to-one transition, for example 1100. Each time the zero-to-one transition cycles around ring shift registers 50, 52, 54 and 56, output 70 and the inverse 72 change state to generate one-half of a square-wave at twice the frequency desired at output 64. Two contiguous cycles of 1100 around the ring shift registers generates the full square wave at output 64.

The desired clock signal is generated using two levels of count down circuits and two levels of multiplexing. Multiplexer 60 provides a first level of multiplexing. Select inputs 62 are four select input bits that control which ring shift register output is presented as output 64 of multiplexer 60. The divide by two function provided by flip flop 66 provides the final divide down function of any of the sixteen inputs on bus 58 and also generates the divided down inverse of the sixteen input signals available on bus 58. Multiplexer 68 provides a second level of multiplexing. Select input 74 is a one-bit select input control that determines which flip flop output signal 70 or 72 is presented at the output 76 of multiplexer 68. In this manner, the divide by four function provided by the ring shift registers is followed by a divide by two function of only a selected one of the available ring shift register stage outputs to accomplish an effective divide by eight function.

Figure 4:
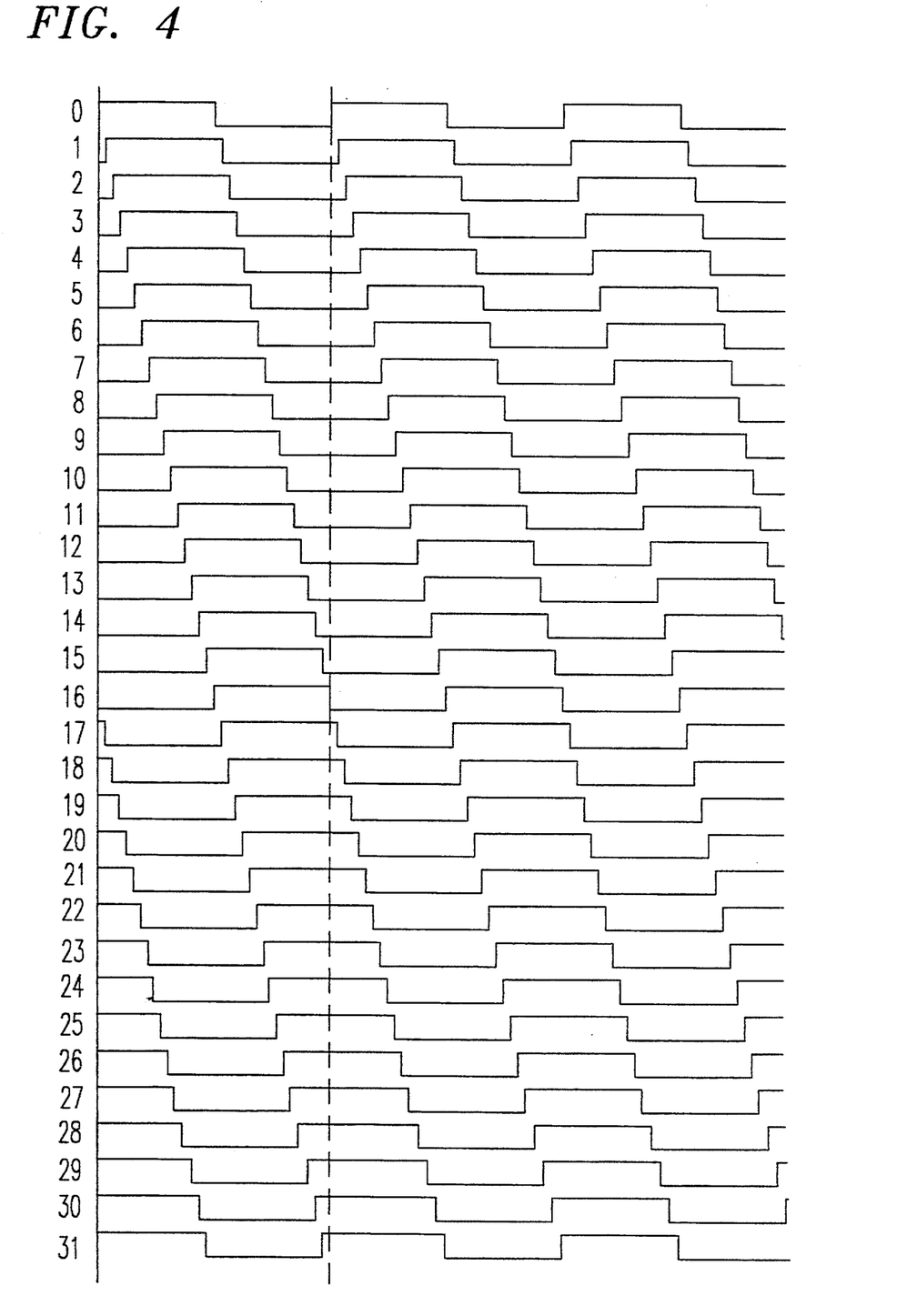
FIG. 4 is a graphical diagram showing the desired clock signal phases generated by the circuit of FIG. 2.

In the illustrated embodiment, there are thirty two possible desired clock signal phases or timing signals at the desired clock signal frequency that can be presented as output 76. Each of the thirty two timing signals is a phase of the desired or programmed clock signal and is shown in FIG. 4. The desired clock signal phase defined arbitrarily as the reference phase having no phase shift is designated 0. The other timing signals are evenly spaced across one clock cycle of the reference phase.

Generally, with K equally spaced oscillator clock signal phases (resulting in K ring shift registers, one clocked by each of the K oscillator clock signal phases—four in the illustrated embodiment), the multiple of the oscillator clock signal frequency to the desired clock signal frequency being H (eight in the illustrated embodiment), with the oscillator clock signal frequency being divided down by L (eight in the illustrated embodiment), the number of phases of the desired clock signal that can be generated are K×L. The phases of the desired clock signal are spaced at intervals of 1/(K×L) of the desired clock signal period.

Figure 5:
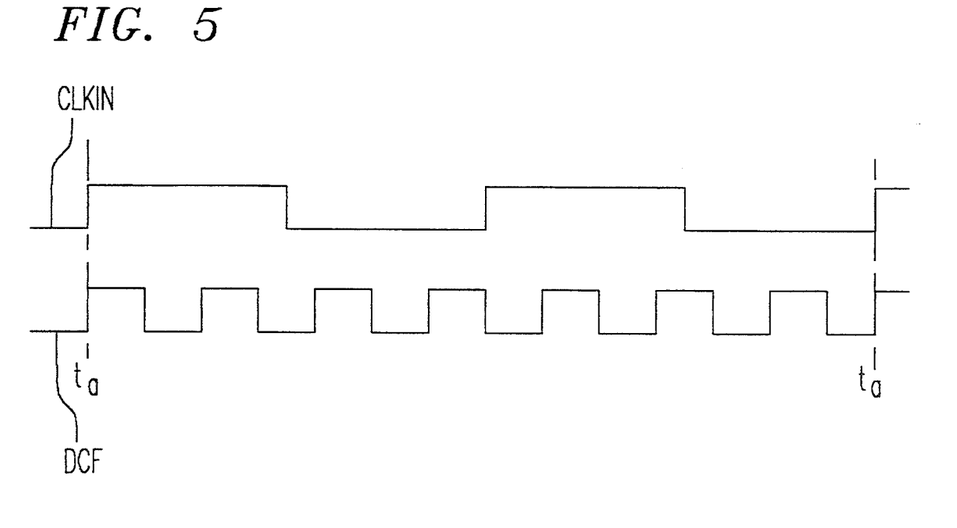
FIG. 5 illustrates an ideal pair of clock signals of different frequencies for alignment.

Masking circuit 32 determines at what periodic points in time alignment should occur. Each occurrence of this time will be referred to as alignment time, $t_a$. Alignment here will be with respect to the rising leading edge of the reference clock signal CLKIN and the rising leading edge of the desired clock signal occurring simultaneously. Since the frequency of the desired clock signal is a multiple of the frequency of CLKIN by the ratio of M/N, there is one point in time each M cycles of the desired clock signal and each N cycles of CLKIN that a comparison should be made to determine whether the desired clock signal and CLKIN are aligned. Illustratively, this can be seen in FIG. 5 for the example where M/N is 7/2. Only at those points in time where two cycles of CLKIN and seven cycles of the desired clock signal coincide should alignment be expected.

Figure 6:
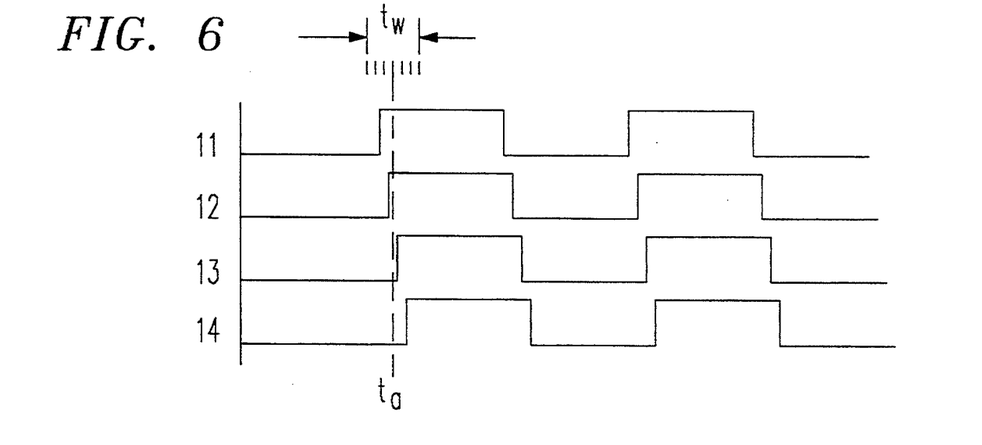
FIG. 6 illustrates a time window and alignment time around which alignment is constructed, as well as portions of illustrative ones of the desired clock signal phases, on an enlarged scale, from FIG. 4.

Masking circuit 32 establishes a window of time, $t_w$, around the alignment time for making a comparison. The width of the window should be sized to cover a few desired clock signal phases, as generated by clock phase generation circuit 26, on each side of the alignment time $t_a$. A window of time $t_w$ having a width of three desired clock signal phase increments on each side of the alignment time $t_a$ is shown in FIG. 6. The alignment time occurs periodically when divide by N counter 14 and divide by M counter 24 simultaneously count to 0. Masking circuit 32 receives as inputs the outputs of divide by N counter 14 and divide by M counter 24, and upon the occurrence of each alignment time $t_a$ provides CLKIN and the selected one of the phases of the desired clock signal as determined by clock phase selection circuit 28 as outputs that are coupled as inputs to phase detector 34.

Phase detector 34 compares the phases of the two inputs. The output of the phase detector is either a logic 1 or a logic 0, depending on whether the rising leading edge of the desired clock signal phase occurs before the rising leading edge of the reference clock signal or whether the rising leading edge of the reference clock signal occurs before the rising leading edge of the desired clock signal phase.

The various phases of the desired clock signal produced by desired clock signal phase generation circuit 26 and available at output 76 are systematically compared by phase detector 34 to the reference clock signal to select one of the desired clock signal phases as being aligned with the reference clock signal. Clock phase sequencing circuit 30 controls, through clock phase selection circuit 28, the selection of one of the desired clock signal phases generated by desired clock signal phase generation circuit 26 by systematically sequencing through binary select inputs 62 and 74. The binary select inputs can be sequenced such as by incrementing or decrementing the least significant bit of an accumulator. The aggregated binary select inputs 62 and 74 identifies which one of the thirty two (K×L) desired clock signal phases is selected by circuit 28 for comparison. When the select inputs are incremented or decremented from an initialized zero, the accumulator accumulates the number of desired clock signal phases compared to the reference clock signal.

With the selection of each desired clock signal phase for comparison to the reference clock signal, the output of phase detector 34 is observed. The next desired clock signal phase is selected for comparison to the reference clock signal and another comparison is made. If a transition occurs on the output of phase detector 34, either from 1 to 0 or from 0 to 1, then a corresponding transition has occurred in the timing relationship between the rising leading edge of the reference clock signal and the rising leading edge of the two most recently compared desired clock signal phases. In one case the rising leading edge of the reference clock signal has gone from occurring before the rising leading edge of the desired clock signal phase in the previous comparison to occurring after the rising leading edge of the desired clock signal phase to which it is being compared. In the other case the rising leading edge of the reference clock signal has gone from occurring after the rising leading edge of the desired clock signal phase in the previous comparison to occurring before the rising leading edge of the desired clock signal phase to which it is being compared. Either of the two most recent desired clock signal phases compared to the reference clock signal may be considered aligned with the reference clock signal. Absent a desired clock signal phase that is precisely aligned with the reference clock signal, these two desired clock signal phases will each have a rising leading edge that is within 1/32 (1/(K×L)) of the desired clock signal period of the rising leading edge of the reference clock signal.

FIG. 6 illustrates an exemplary alignment time $t_a$ and window $t_w$ superimposed over an enlarged scale portion of four of the desired clock signal phases shown in FIG. 4. Upon sequencing from desired clock signal phase 11 to desired clock signal phase 12, and phase comparing desired clock signal phase 12 with the reference clock signal, the output of phase detector 34 does not change state. Upon sequencing from desired clock signal phase 12 to desired clock signal phase 13, the output of phase detector 34 changes state. Either desired clock signal phase 12 or desired clock signal phase 13 may be selected as the desired clock signal phase aligned with the reference clock signal. It is noteworthy that the sequencing could occur by increasing or decreasing the desired clock signal phase number, corresponding to approaching $t_a$ from either the left or the right, as shown in FIG. 6, with the same result.

In looking for a transition on the output of phase detector 34, one technique is simply to detect whether the output is a 1 or a 0. If the first comparison produces the output that is being sought, clock phase selection circuit 28 can select as the next desired clock signal phase for comparison a desired clock signal phase that is assuredly outside the window $t_w$. This may be achieved such as by adding a number greater than the number of desired clock signal phases represented by half of the window to the aggregated binary select inputs 62 and 74 to shift in the desired clock signal phases to select a desired clock signal phase for the next subsequent comparison. Since the aggregated binary select input 62 and 74 identify which one of the thirty two (K×L) desired clock signal phases is selected by circuit 28 for comparison, it is convenient to select the most recently compared desired clock signal phase as the desired clock signal phase or timing signal that is considered aligned with the reference clock signal.

When a desired clock signal phase has been selected as being aligned with the reference clock signal, the normalization process is complete and the masking circuit is disabled. The time reference is then redefined to be the desired clock signal phase or timing signal that is aligned with the reference clock signal. This shifts the time reference relative to the input clock signal to result in no apparent delay through the integrated circuit from pad 2 to pad 9.

The aggregated binary select inputs 62 and 74 identify the desired clock signal phase time reference. If the sequencing process was achieved by incrementing the least significant bit of select inputs 62 and 74, from an initialized zero, the accumulated select inputs represent the increment that must be added to the select inputs of each output circuit as a signal step update.

Once the normalization process is complete, there is no need to realign the desired clock signal with the clock reference clock signal as long as the integrated circuit remains powered. The normalization process described herein permits alignment of the desired clock signal with the clock reference signal at the periphery of the integrated circuit.

In an alternate embodiment, normalization in clock alignment circuit 10' is achieved in a similar manner. Each of ring shift registers 50, 52, 54, and 56 may be disabled on start-up and subsequently enabled, necessitating an alternate method of generating a phase of the desired clock signal to feedback. Reference clock signal phase selection circuit 128 operates in the same manner as shift register 50 and clock phase selection circuit 28. Reference clock signal phase selection circuit 128 provides a feedback reference desired clock signal phase that is aligned with the reference clock signal by operation of the phase locked loop as discussed below. Ring shift register 130 in the illustrated embodiment is identical to ring shift register 50 and is clocked by one of the phases of the oscillator clock signal. Multiplexer 132 can select, based on select inputs 134, any of the stage outputs as the output of multiplexer 132. Select input 140 determines which input to multiplexer 138 is presented as output 142. By setting the select inputs on multiplexers 132 and 138, one of the phases of the desired clock signal is selected as output 142.

In a preferred embodiment, the stages of ring shift register 130 are preset to the same states as the corresponding stages of ring shift register 50, and ring shift register 130 is clocked by CLK1. In addition, the select inputs 134 and 138 are set to select as output 142 the same desired clock signal phase as is generated by stage S1 of ring shift register 50, and ring shift registers 50, 52, 54, and 56 are enabled such that ring shift register 50 is synchronized with ring shift register 130.

Output 142 is coupled to dummy pad 9, which has no off-chip interconnections, through output driver 7 to simulate the operating conditions of outputs represented by output circuit 80, output driver 60, and pad 8. Input driver 120 completes the feedback loop from pad 9 to divide by M counter 24. Input driver 120 may be present to balance the operating conditions between the feedback from pad 9 and phase comparator 16 to substantially identical to the operating conditions impacting the reference clock signal between pad 2 and phase comparator 16. By balancing the operating conditions, a more precise alignment of the phase of the desired clock signal at output 142 with the reference clock signal can be achieved.

The phase of the desired clock signal presented as output 142 is aligned with the reference clock signal 20 through operation of the phase locked loop. The oscillator clock signal frequency is divided down by reference clock signal phase selection circuit 128 to the desired clock signal frequency and further divided down by the divide by M counter. When the divide by M counter and the divide by N counters simultaneously count to zero, a phase comparison is made by phase detector 16 to compare the reference clock signal received at pad 2 to the feedback reference clock signal phase generation circuit output presented at pad 9. The oscillator control 18 accelerates or decelerates oscillator 20 sufficiently to align a rising leading edge of the phase of the desired clock signal presented as output 142 with a rising leading edge of the reference clock signal and continuously maintains the alignment. In this manner, the external second phase locked loop of circuit 10 is incorporated into the previous internal phase locked loop, resulting in a single phase locked loop. The clock alignment circuit phase locked loop extends from the input to the output of the integrated circuit to eliminate delays introduced within the integrated circuit between the output of the phase locked loop and the output of the integrated circuit.

Figure 9:
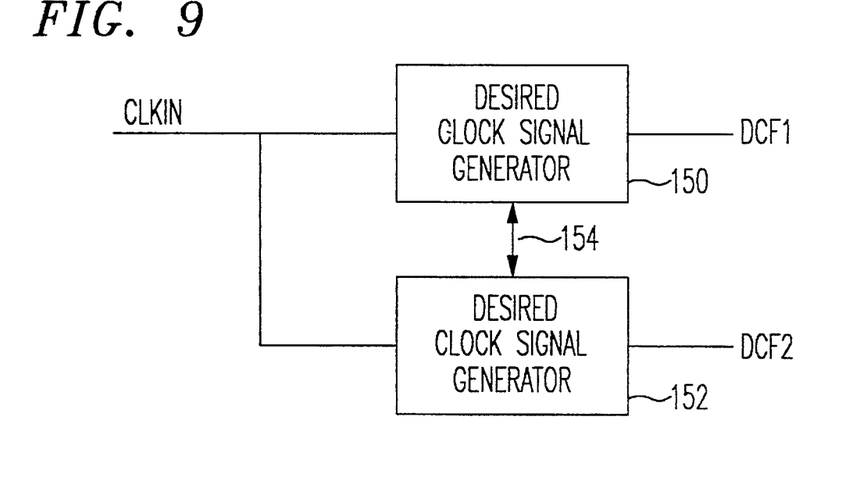
FIG. 9 is a block diagram illustrating alignment of two clock signals to a reference clock signal.
Figure 10:
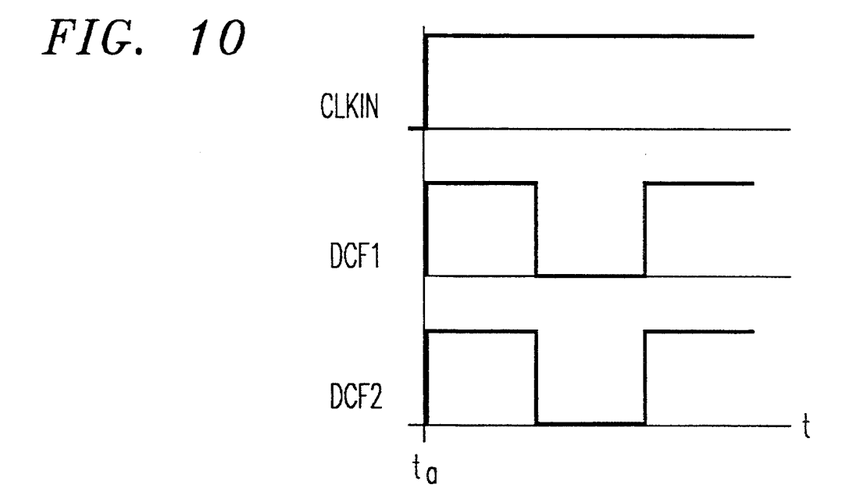
FIG. 10 is a graphical diagram showing the clock signals of the two clocks in FIG. 10 aligned with a reference clock signal.

Normalization or alignment of the desired clock signal with the reference clock signal as described above may be used to synchronize two clocks to a reference clock signal. As shown in FIG. 9 and in the manner described above, first and second desired clock signals DCF1 and DCF2, generated respectively by desired clock signal generators 150 and 152, are simultaneously or sequentially aligned with a common reference clock signal CLKIN. In aligning the first and second desired clock signals each with a reference clock signal, they are aligned with each other as shown in FIG. 10. To minimize any misalignment, each of the two desired clock signals should be aligned using the same manner of sequencing.

Figure 11:
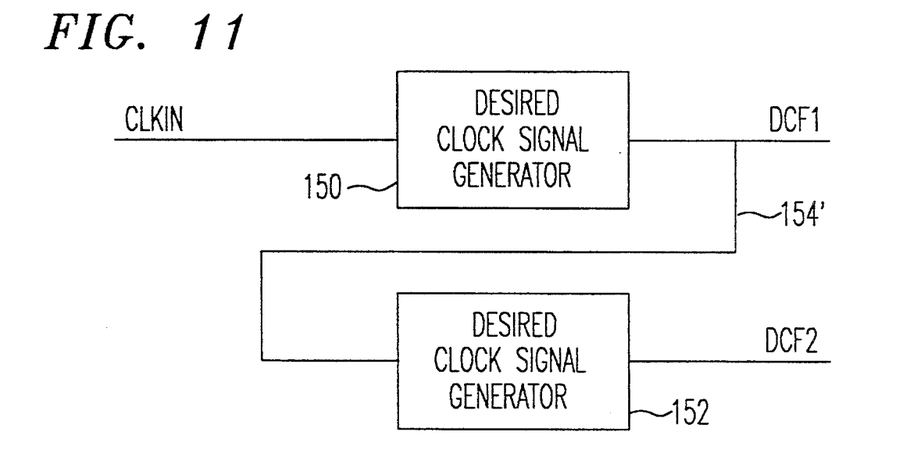
FIG. 11 is a block diagram illustrating an alternate embodiment alignment of two clock signals to a reference clock signal.

When the M/N ratio is not an integer, a synchronizing signal is provided from one of two clocks being aligned to the other. While the two clocks being aligned operate at the same frequency, there is the possibility they are operating out of phase. The synchronizing signal permits both clocks to synchronize to the same phase. Synchronizing signal 154, shown in FIG. 9, synchronizes the counting of divide by M counter 24 and divide by N counter 14 of desired clock signal generator 150 with the corresponding counters of desired clock signal generator 152. Alternatively the synchronizing signal may take the form shown in FIG. 11 in which synchronizing signal 154' provides the output of desired clock signal 150 as the input clock signal to desired clock signal generator 152. The first desired clock signal DCF1 is aligned as described above with the reference clock signal, and the second desired clock signal DCF2, typically with the M/N ratio set to one, is aligned as described above with the first desired clock signal. In this manner, both DCF1 and DCF2 are aligned with the reference clock signal as shown in FIG. 10.

Those skilled in the art can easily implement the clock alignment circuit in silicon. While the invention has been described as being implemented by an integrated circuit, it is recognized that other embodiments of the invention could be software implemented.

We claim:

1. An integrated circuit, comprising:

a frequency synthesizer for receiving a reference clock signal and for generating a plurality of phase clock signals which are phases of an oscillator output clock signal;

a desired clock signal phase generating circuit coupled to the frequency synthesizer, the desired clock signal phase generating circuit receiving a plurality of phase clock signals and generating various phases of desired clock signals; and a clock phase selection circuit coupled to the desired clock signal phase generating circuit, the clock phase selection circuit selecting one of the phases of the desired clock signals as an output, whereby the selected phase of the desired clock signal phase is available for comparison to the reference clock signal.

2. An integrated circuit, comprising:

a frequency synthesizer for receiving a reference clock signal and for generating a plurality of phase clock signals which are phases of an oscillator output clock signal;

a desired clock signal phase generating circuit coupled to the frequency synthesizer, the desired clock signal phase generating circuit receiving a plurality of phase clock signals and generating various phases of desired clock signals;

a clock phase selection circuit coupled to the desired clock signal phase generating circuit, the clock phase selection circuit selecting one of the phases of the desired clock signals as an output, whereby the selected desired clock signal phase is available for comparison to the reference clock signal;

a masking circuit for defining a window of time during which alignment of the selected desired clock signal phase with the reference clock signal should occur; and a phase detector for receiving the reference clock signal and the selected desired clock signal phase, the phase detector for comparing the selected desired clock signal phase to the reference clock signal during the window of time to determine if the selected desired clock signal phase is aligned with the reference clock signal, whereby the selected desired clock signal phase is aligned with the reference clock signal.

3. An integrated circuit as recited in claim 1, further comprising a clock phase sequencing circuit for selecting another one of the phases of the desired clock signals for comparison to the reference clock signal.

4. An integrated circuit as recited in claim 1, further comprising a clock phase sequencing circuit for systematically selecting another one of the phases of the desired clock signals for comparison to the reference clock signal until a timing signal is identified as aligning with the reference clock signal.

5. An integrated circuit as recited in claim 4, wherein the clock phase sequencing circuit further comprises an accumulator for accumulating the number of phases of the desired clock signals compared to the reference clock signal.

6. An integrated circuit as recited in claim 2, further comprising an output pad driven by the desired clock signal phase generating circuit.

7. An integrated circuit, comprising:
- a frequency synthesizer for receiving a reference clock signal and for generating a plurality of phase clock signals which are phases of an oscillator output clock signal;
- first and second desired clock signal phase generating circuits, coupled to the frequency synthesizer, the first and second desired clock signal phase generating circuits receiving a plurality of phase clock signals and generating various phases of first and second desired clock signals;
- first and second clock phase selection circuits, each for selecting one of the phases of the desired clock signals the first clock phase selection circuit coupled to the first desired clock signal phase generating circuit for selecting one of the various phases of the first desired clock signals generated by the first desired clock signal phase generating circuit as an output from the integrated circuit, and the second clock phase selection circuit coupled to the second desired clock signal phase generating circuit for selecting one of the various phases of the second desired clock signal generated by the second desired clock signal phase generating circuit for feedback to the frequency synthesizer and for comparison to the reference clock signal.

8. An integrated circuit as recited in claim 7, further comprising:
- an input driver for receiving the reference clock signal and for providing the reference clock signal to the frequency synthesizer;
- a driver for receiving the selected one of the various phases of the second desired clock signals generated by the second desired clock signal generating circuit for feedback to the frequency synthesizer.

9. A method of aligning an oscillator generated clock output signal with a reference clock signal, comprising the steps of:
- generating a plurality of phase clock signals which are phases of an oscillator output clock signal;
- employing the plurality of phase clock signals to generate a plurality of phases of desired clock signals;
- selecting one of the desired clock signal phases; and
- comparing the selected desired clock signal phase to the reference clock signal to determine whether the compared desired clock signal phase is aligned with the reference clock signal.

10. A method of aligning an oscillator generated clock output signal with a reference clock signal, comprising the steps of:
- generating a plurality of phase clock signals which are phases of an oscillator output clock signal;
- employing the plurality of phase clock signals to generate a plurality of phases of desired clock signals;
- selecting one of the desired clock signal phases;
- comparing the selected desired clock signal phase to the reference clock signal to determine whether the compared desired clock signal phase is aligned with the reference clock signal; and
- defining a window of time during which alignment of one of the desired clock signal phases with the reference clock signal should occur, and conducting the comparison during the window of time.

11. A method as recited in claim 9, further comprising the step of selecting another one of the desired clock signal phases for comparison to the reference clock signal.

12. A method as recited in claim 11, wherein the step of selecting another one of the desired clock signal phases is accomplished by incrementing a counter.

13. A method as recited in claim 9, further comprising the step of selecting systematically another one of said desired clock signal phases for comparison to the reference clock signal until a desired clock signal phase is identified that aligns with the reference clock signal.

14. A method as recited in claim 13, further comprising the step of providing the desired clock signal phase that aligns with the reference clock signal as an output signal.

15. A method of aligning an oscillator generated clock output signal with a reference clock signal, comprising the steps of:
- generating a plurality of clock signals which are phases of an oscillator output clock signal;
- employing the plurality of phase clock signals to generate a plurality of phases of desired clock signals;
- selecting one of the desired clock signal phases;
- comparing the selected desired clock signal phase to the reference clock signal to determine whether the compared desired clock signal phase is aligned with the reference clock signal;
- Systematically selecting another one of the desired clock signal phases for comparison to the reference clock signal until a desired clock signal phase is identified that aligns with the reference clock signal; and
- accumulating the number of desired clock signal phases compared in an accumulator.

16. A method of aligning two clock signals to each other, comprising the steps of:
- generating a plurality of clock signals which are phases of a first oscillator output clock signal;
- employing the plurality of phase clock signals of the first oscillator output clock signal to generate a plurality of first desired clock signal phases;
- systematically selecting and comparing the first desired clock signal phases to the reference clock signal, one at a time, until a first desired clock signal phase is identified as aligning with the reference clock signal;
- providing the phase of the first desired clock signal that is aligned with the reference clock signal as a first clock signal output, thereby aligning the first desired clock signal with the reference clock signal;
- generating a plurality of clock signals which are phases of a second oscillator output clock signal;

employing the plurality of phase clock signals of the second oscillator output clock signal to generate a plurality of second desired clock signal phases;

systematically selecting and comparing the second desired clock signal phases to the reference clock signal, one at a time, until a second desired clock signal phase is identified as aligning with the reference clock signal; and providing the phase of the second desired clock signal that is aligned with the reference clock signal as a second clock signal output, thereby aligning the second desired clock signal with the reference clock signal, whereby the first and second clock signals are each aligned with the reference clock signal and therefore are aligned with each other.

17. A method as recited in claim 16, wherein the frequency of the first clock signal output differs from the frequency of the reference clock signal.

18. A method of aligning two clock signals with each other, one of the clock signals generated by a first clock generator and the other clock signal generated by a second clock generator, the method comprising the steps of;

generating a plurality of clock signals which are phases of a first oscillator output clock signal;

employing the plurality of phase clock signals of the first oscillator output clock signal to generate a plurality of first desired clock signal phases;

systematically selecting and comparing the first desired clock signal phases to the reference clock signal, one at a time, until a first desired clock signal phase is identified as aligning with the reference clock signal;

providing the phase of the first desired clock signal that is aligned with the reference clock signal as a first clock signal output, thereby aligning the first desired clock signal with the reference clock signal;

generating a plurality of clock signals which are phases of a second oscillator output clock signal;

employing the plurality of phase clock signals of the second oscillator output clock signal to generate a plurality of second desired clock signal phases;

systematically selecting and comparing the second desired clock signal phases to the reference clock signal, one at a time, until a second desired clock signal phase is identified as aligning with the reference clock signal; and providing the phase of the second desired clock signal that is aligned with the reference clock signal as a second clock signal output, thereby aligning the second desired clock signal with the reference clock signal;

providing a synchronizing signal between first and second clock generators generating the two clock signals, whereby the first and second clock signals are each aligned with the reference clock signal and therefore are aligned with each other.

19. A method as recited in claim 18, wherein providing a synchronizing signal further comprises providing the first clock signal output as the reference clock signal to the second clock generator.

20. A method as recited in claim 18, wherein providing a synchronizing signal further comprises synchronizing a counter in the first clock generator with a counter in the second clock generator.

* * * * *